United States Patent
McAdam et al.

(10) Patent No.: US 6,480,882 B1
(45) Date of Patent: Nov. 12, 2002

(54) METHOD FOR CONTROL AND COMMUNICATION BETWEEN COMPUTER SYSTEMS LINKED THROUGH A NETWORK

(75) Inventors: Paula Emily McAdam, Shrewsbury; Brian Ronald Gruttadauria, Grafton; Gregory William Lazar, Upton, all of MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/344,681

(22) Filed: Jun. 25, 1999

(51) Int. Cl.[7] .............................................. G06F 15/16

(52) U.S. Cl. ...................... 709/202; 709/200; 709/201; 709/203; 709/315; 709/316; 709/332

(58) Field of Search ................ 709/202, 203, 709/315, 316, 332, 200, 201

(56) References Cited

U.S. PATENT DOCUMENTS

| | | | | |
|---|---|---|---|---|
| 5,923,885 A | * | 7/1999 | Johnson et al. ............. | 717/176 |
| 5,928,323 A | * | 7/1999 | Gosling et al. ............. | 709/203 |
| 5,991,802 A | * | 11/1999 | Allard et al. ................ | 709/219 |
| 6,078,321 A | * | 6/2000 | Simonoff et al. ........... | 345/744 |
| 6,253,228 B1 | * | 6/2001 | Ferris et al. ................. | 709/203 |
| 6,256,620 B1 | * | 7/2001 | Jawahar et al. ................ | 707/2 |

OTHER PUBLICATIONS

JRes: a resource accounting interface for java by Czajkowski et al., ACm p. 21–35, 1998.*

At the forge: Server–Side Java with Jakarta–Tomcat; by Reuven M. Lerner; Linux Journal, article No. 10. 2001.*

* cited by examiner

*Primary Examiner*—Ayaz Sheikh
*Assistant Examiner*—Frantz B. Jean

(57) ABSTRACT

A method for controlling an operation of a server system by a client system interconnected with the server by a network. The server includes a network communications server facility, a server resident scripting utility for creating and executing server scripts and a resident server page that includes a scripting for creating a server object, the server object including a server method for controlling an operation of the server system and an applet for invoking the server page and corresponding to a server method to be executed in the server system. The client includes a browser for communicating with the server. A translated server page is downloaded from the server to the client. The translated server page corresponds to the server page resident in the server and the script in the translated server page is translated into a form executable by the browser in the client. An input to the client invokes the applet, which in turn invokes the script of the translated server page. The server system responds to the translated script by creating an instance of the server object and executing the server method corresponding to the applet. The translated script may also pass an argument to the server object after the server object is invoked, and the server method may return data to the translated server page and the applet may read the returned data and the state of the applet may be updated according to the returned data.

5 Claims, 5 Drawing Sheets

```
<html>

<head>
<title>Example Page1</title>
<meta name="GENERATOR" content="Microsoft FrontPage 3.0">
</head>

<body>
<p>
<applet width="580 height="315" code="COM.dg.example.Example1.class" codebase="./">
<param name="parm1" Value="16">
<param name="parm2" value="1">
</applet>
</p>
</body>
</html>
```

FIG. 4A

```
{
    Create a URL object passing the address of the ASP page as an input parameter
    Create and open a URLConnection object from the URL object
    Create a DataInputStream object from the input stream of the URLConnection object
}
```

FIG. 4B

```
<head>
<title>Example Page 2</title>
<meta name="GENERATOR" content="Microsoft FrontPage 3.0">
</head>

<body>
<%
set ExampleObject = Server.CreateObject("Example1.Block1")
If IsObject(ExampleObject) Then
        result = ExampleObject.GetAndReturnData Request.QueryString("arg1")
Request.QueryString("argN")
Else
        Response.Write("Error: Could not create the object <BR>")
End if
%>
</body>
</html>
```

FIG. 4C

ExampleObject.GetAndReturnData(arg1, argN)
    Process any input data
    Perform actions
    Write data to ASP page
    Return status

FIG. 4D

{
   Read as input data via the DataInputStream object
      the output that was written to the ASP page
   Process the input data
   Update the Java applet GUI as desired
   Close the DataInputStream
}

FIG. 4E

METHOD FOR CONTROL AND COMMUNICATION BETWEEN COMPUTER SYSTEMS LINKED THROUGH A NETWORK

FIELD OF THE INVENTION

The present invention relates to a method and apparatus for control and communication between computer systems linked through a network and, in particular, to a method and apparatus for communicating through a public network with automation server objects from Java applets via active server pages.

BACKGROUND OF THE INVENTION

Computers are commonly interconnected by networks so that one computer of the network, often referred to as a client, can call upon or control another computer, which is often referred to as a server, for the other computer to provide some service or function for the first computer. Such systems require that at least some of the computers in the system, such as one or more client computers, be capable of monitoring, managing and maintaining the server computers, which in turn requires an inter-computer communication and control facility capable of operating through the network and of supporting monitoring, management and maintenance functions. This problem of communication monitoring, management and maintenance between computers has been solved in a variety of ways for proprietary systems, that is, systems using private networks, which typically provide proprietary or private communications facilities for these functions.

The requirement for communications capable of supporting monitoring, management and maintenance functions between computers linked through public networks, such as the Internet or telephonic systems and other public area networks, however, remains a problem. Such communications are often provided through specialized or proprietary communications programs, some of which additionally require specialized or proprietary hardware components, or through adaptations of communications programs, such as KERMIT, that were originally intended only for basic functions, such as the transfer of files. These methods, however, not only increase the cost and complexity of the computers and the systems, but have been generally unsatisfactory in the case of communications programs that have been adapted from other purposes.

In addition, the use of such specialized or proprietary communications programs effectively bar any computer not provided with the specific communication program, and perhaps hardware, from operating in the networked system unless the specific program, and possibly hardware components, has been installed in the computer. This is a severe disadvantage in many applications, such as client computers networked to server computers through the Internet, as it is often desirable to be able to rapidly and easily integrate client computers into an Internet based system without the addition of new software components in each client, and certainly without requiring the installation of specialized hardware components.

The prior art has attempted to solve these problems, with results that have generally been unsatisfactory. For example, Common Gateway Interface (CGI) is a standard interface for running external programs or gateways on a World Wide Web information server. This method extends the functionality of a Web server by executing programs or scripts on a Web server in response to requests from a Web browser residing on a client of the server wherein the browser sends form data to a CGI script or the server and the script on the server processes the data and sends the results back in a HTML page. The CGI method, however, has been unsatisfactory because, first, it is adapted only to performing predefined operations on data from a client, but does not otherwise allow a client to control operations of the server. In addition, and while the CGI method returns data to the client, it does not support dynamic updating of functions in the requesting client.

The Internet Server Application Program Interface (ISAPI) server extensions method provides an alternative to the use of CGI applications for Internet servers wherein Internet Server Applications (ISAs) run in the same address space as the HTTP server and have access to all of the resources available to the HTTP server. The use of ISAPI server extensions has, however, been unsatisfactory because this facility is a special purpose extension to a conventional Web browser and is found in and is compatible only with a limited number of Web browsers.

Yet another alternative, Remote Method Invocation, is a Java compatible mechanism for distributed client/server applications that allow Java client applets to remotely access Java server objects and invoke the methods of those objects. Again, however, Remote Method Invocation is an extension to conventional Web browsers and is found in and is compatible with only a limited number of Web browsers. In addition, this method does not allow a browser to directly access native automation server objects on a server, but only Java server objects, so that a Java server application can interface with the server system native code, such as native automation server objects on the server, only through specially developed, additional interface layer.

The present invention provides a solution to these and other problems of the prior art.

SUMMARY OF THE INVENTION

The present invention is directed to a method for use in a system including a client system and a server system interconnected through a network for controlling an operation of the server system by the client system. The server system includes a network server facility to control network communications and a server resident scripting utility for creating and executing server scripts and the client system includes a browser for communicating with the server system through the network. The server system further includes a resident server page that includes a scripting for creating a server object, wherein the server object includes a server method for controlling an operation of the server system, and an applet for invoking the server page and corresponding to a server method to be executed in the server system.

According to the present invention, a translated server page is downloaded from the server system to the client system wherein the translated server page corresponds to the server page resident in the server system and the script in the translated server page is translated into a form executable by the browser resident in the client system. In the client system, an input is provided to invoke the applet, which in turn invokes the script of the translated server page. Thereafter, the server system responds to operation of the translated script in the translated server page by creating an instance of the server object and executing the server method corresponding to the applet. The translated script in the translated server may also pass an argument to the server object after the server object is invoked. In addition, the server method may return data to the translated server page, the applet may read the returned data and the state of the applet may be updated according to the returned data.

DESCRIPTION OF THE DRAWINGS

The foregoing and other objects, features and advantages of the present invention will be apparent from the following description of the invention and embodiments thereof, as illustrated in the accompanying figures, wherein.

DESCRIPTION OF THE INVENTION

Figure 1:
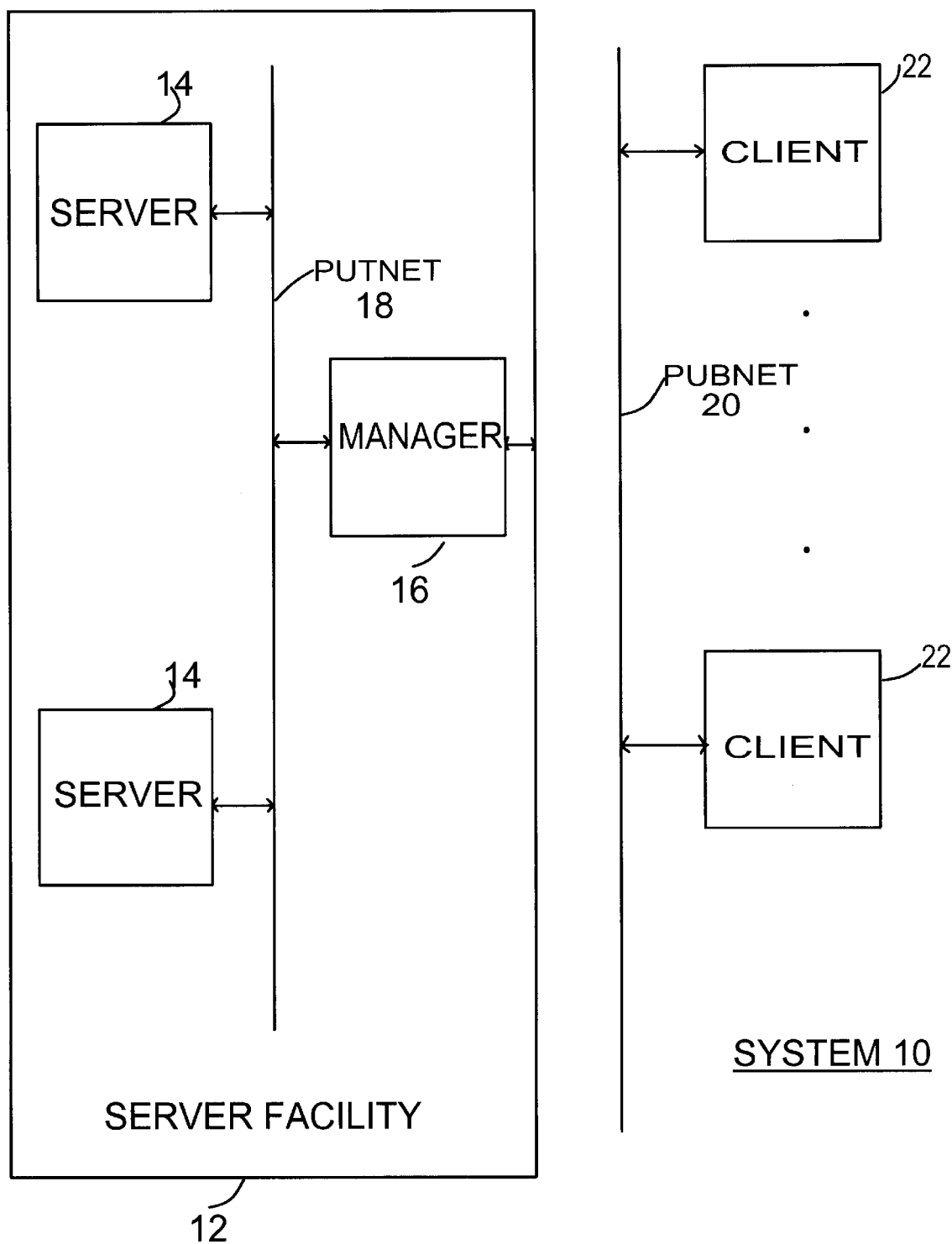
FIG. 1 is a block diagram illustration of a typical network based System 10 incorporating the present invention.

Referring to FIG. 1, therein is shown a block diagram illustration of a typical network based System 10 incorporating the present invention. As shown therein, an Internet based System 10 will typically include a Server Facility 12 comprised of one or more Server Computers (Servers) 14 that are interconnected with one another and to a Server Manager Computer (Manager) 16 through a Private Network (PvtNet) 18. Manager 16 is in turn interconnected through a Public Network (PubNet) 20, such as the Internet, with one or more Client Computers (Clients) 22. In such a System 10, Servers 14 will typically provide services and functions for Clients 22, such as data storage and certain operations on data, while Manager 16 monitors, manages and maintains the functions and operations of Servers 14 and PvtNet 18 and provides a managed communication link between Server Facility 12 and Clients 22 through PubNet 20. Clients 22, in turn, are typically controlled and used by users of System 10 to perform operations for or on behalf of the users, using either the local facilities of Clients 22 or, when necessary, the services and functions provided by Server Facility 12.

It will be understood by those of ordinary skill in the relevant arts that Servers 14, Manager 16 and Clients 22 may be implemented by standard, readily available computers. Such computers will typically include such components as a processor for executing programs and operating on data, a memory and a mass storage device for storing programs and data, input/output devices such as displays, keyboards and mouses, and network communications devices, such as modems, to interface with and communicate through PvtNet 18 and PubNet 20.

It will also be likewise understood that the system configuration illustrated in FIG. 1 may vary significantly without altering the primary functions performed by the system and the functional relationships and operations of the major components of the system. For example, Server Facility 12 may be comprised of a single Server 14 that combines and performs the functions of Servers 12 and Manager 16, and that the System 10 may accordingly not include a PvtNet 18. It will also be appreciated by those of ordinary skill in the relevant arts that functions performed by the hierarchical organization or structure of Servers 14, Manager 16 and Clients 22 may be equally performed by a system including only Clients 22 and a PubNet 20, that is, that some Clients 22 may serve as Servers 12 and Manager 16 for other Clients 22, depending upon the functions and operations to be provided. It will be understood that, in fact, that the functions of Servers 14 may effectively move about among the Clients 22, depending upon the functions and services to be provided at any given time. The primary functional relationship between the computers of System 10 for the purposes of the present invention is that the system contain, at any given time, at least two computers wherein one operates as a Server 14/Manager 16 computer and the other as a Client 22 computer. The present invention, which is described below, may therefore be implemented not only in a Server 14/Client 22 system such as illustrated in FIG. 1, but as a means of communication and control between any configuration of networked computers wherein one computer operates as a server and another as a client.

Figure 2:
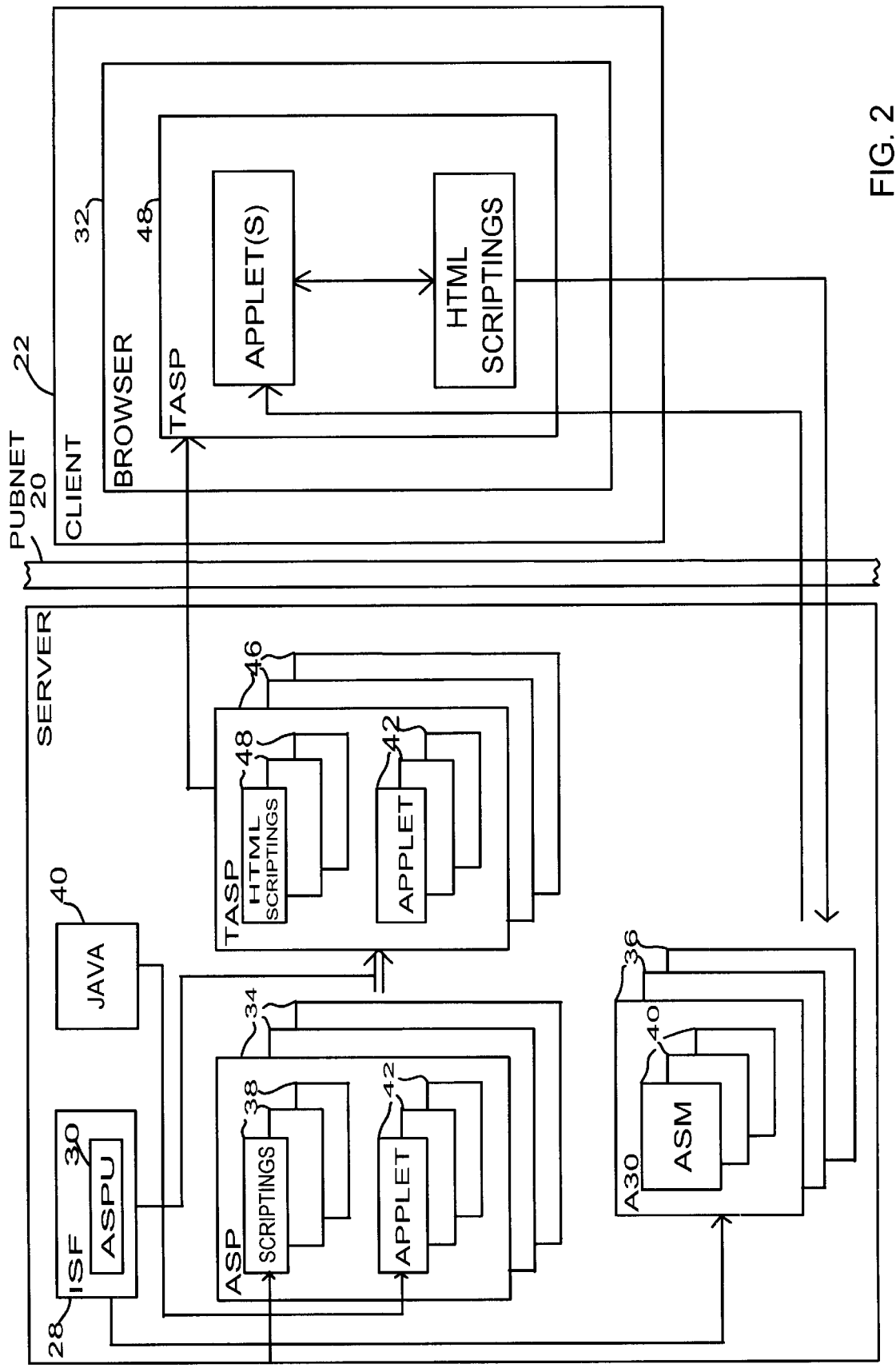
FIG. 2 is a block diagram of a system including a server computer and a client computer and of the component elements of the present invention.

For purposes of illustrating an embodiment and implementation of the present invention, a System 24 incorporating the present invention is represented in FIG. 2 as comprised of a Server/Manager (SERVER) 26 interconnected with one or more Clients 22 by means of a PubNet 20. In the presently preferred embodiment, PubNet 20 comprised of the WWW as implemented on the Internet. It will be noted that while Server 26 is shown as implemented in a single computer, Server 26 is assumed to be capable of providing the same or equivalent services and functions as a Server Facility 12. It will also be understood that Server 26 may be implemented, for example, as a Server Facility 12 comprised, as illustrated in FIG. 1, of one or more Servers 14, a Manager 16 and a PvtNet 18, or in any of a wide variety of other configurations.

As illustrated in FIG. 2, Server 26 includes an Internet Server Facility (ISF) 28, such as Microsoft's NT4.0 Internet Information Server (IIS), which functions as a network server facility to control and implement PubNet 20 communications functions as described in the following. As shown, Server 26 further includes an Active Server Page Utility (ASPU) 30, such as Microsoft's Active Server Pages that is included in Microsoft's NT4.0 Internet Information Server (IIS), that functions as a server resident scripting environment that may be used to create and run dynamic, interactive WWW server scripts. Each Client 22, in turn, is provided with a resident Web Browser (Browser) 32 of the type commonly found in systems communicating with and over the WWW, such as Microsoft's Internet Explorer 4.01 or Netscape 4.0. As will be described below, a Client 22 requires no facility other than a Browser 32 in order to communicate with and control operations of a Server 26, including controlling, monitoring, managing or maintaining the functions and operations of the Server 26.

According to the present invention, ASPU 30 is used to create one or more Active Server Pages (ASP) 34 and, for each ASP 34, one or more Automation Server Objects (ASOs) 36 that are created by Scriptings 38 contained within the ASPs 34 wherein each ASO 36, in turn, includes one or more Automation Server Methods (ASMs) 40. The methods for using ASPU 30 for such purposes will be understood by those of ordinary skill in the relevant arts, such as those familiar with, for example, the uses of Microsoft's Active Server Pages that is included in Microsoft's NT4.0 Internet Information Server (IIS). In addition, the reason and purposes for creating such ASPs 34, Scriptings 36, ASOs 36 and ASMs 40 according to the present invention will be understood by those of ordinary skill in the relevant arts after reading the present description of the invention. In a like manner, and as will understood by those of skill in the relevant arts that are familiar with the Microsoft operating system environment, the ASMs 40 of an ASO 36 that is registered on Server 26 in accordance with the Microsoft operating system environment can be executed to perform functions and operations of Server 26, such as controlling, monitoring, managing or maintaining the functions and operations of the Server 26. Finally, and as indicated, each ASP 34 will also contain one or more Java Applets (Applets) 42 wherein, as described below, each Applet 42 is designed to invoke a corresponding ASP 34 and thereby the ASMs 40 of the ASOs 36 associated with the ASPs 34. It should be noted that Server 26 may include a Java Programming Utility, (Java) 44 to create and process Java Script and Java Applets 42, or Applets 42 may be provided to Server 26 from another source, such as another computer.

According to the present invention, one or more ASPs 34 are downloaded from an Server 26 to a Client 22 to enable that Client 22 to communicate with and control the associated ASMs 40 residing in Server 26 wherein the ASMs 40, in turn, operate to control, monitor, manage or maintain the functions and operations of the Server 26, depending upon the particular methods carried out by the invoked ASMs 40. As described, however, it is a primary object of the present invention that a Client 22 should be able to accomplish these functions without the addition of additional, special purpose programs for this purpose and by use of only programs that are commonly found on any Client 22 that is capable of communicating with sites on a PubNet 20 such as the WWW. As such, it is a requirement of the present invention that any ASP 34 and the Scriptings 38 contained therein that are downloaded from an Server 26 to a Client 22 must be capable of being handled by and executed by a conventional Browser 32, without additional programs or functions. For this reason, ASPU 30 additionally creates, for each ASP 34, a corresponding Translated ASP (TASP) 46 by translating the Scriptings 38 contained in each ASP 34 into corresponding and equivalent Hyper Text Markup Language (HTML) Scriptings 48 that can be handled and executed by a conventional Browser 32. It must be noted that most conventional Browsers 32 are typically also capable of handing and executing the Java Applets 42 embedded in the TASPs 46.

Figure 3:
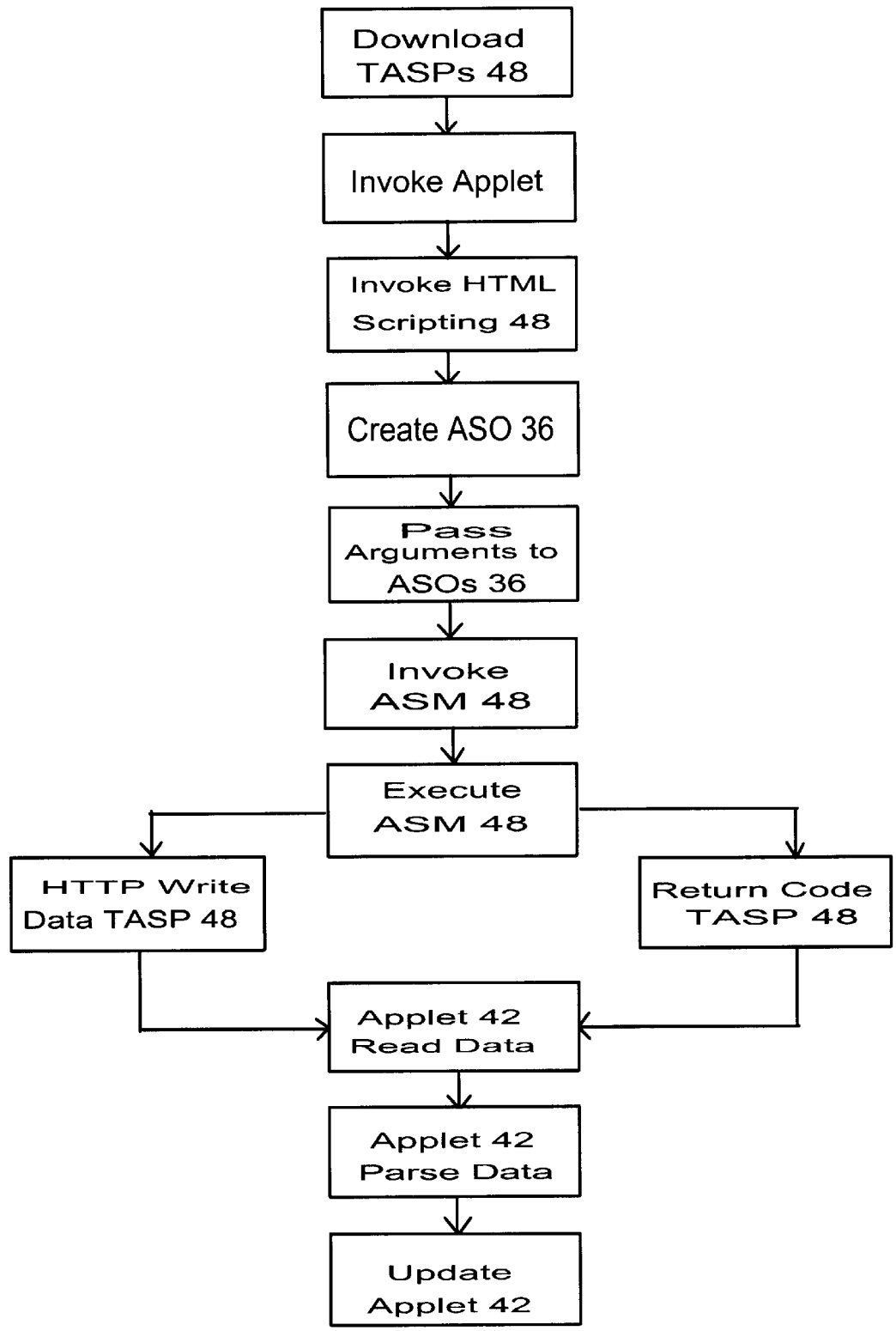
FIG. 3 is a flow diagram of the operation of the present invention; and, FIGS. 4A through 4E are illustrative examples of the various forms of code executed by the present invention.

Referring to FIG. 3, therein is shown a flow diagram of the operation of the present invention as briefly described above and using the components described above. As shown therein, (Step 48) one or more TASPs 46 are downloaded to a Client 22. Browser 32 will display a representation of a TASP 46 with embedded Applets 42 and embedded HTML Scriptings 48 in the same manner as a conventional HTML web page.

A user will (Step 50) invoke an Applet 42 in the usual manner, by "clicking" on the display of the Applet 42, and the invoked Applet 42 will (Step 52) invoke the HTML Scripting 48 of the TASP 46 page to run in the background, that is, to be executed but not displayed within the Browser 32. HTML Scripting 48 will (Step 54) create an instance of the appropriate ASO 36 of the corresponding ASP 34 resident in Server 26, using the existing ASO 36 of the ASP 34, wherein the instance of the appropriate ASO 36 contains the ASMs 40 necessary to carry out the operations indicated by and corresponding to the invoked Applet 42.

The executing TASP 46 page may (Step 56) pass arguments to the ASPU 30 resident in Server 26 by means of an HTTP protocol in the manner:

http://hostname/page/asp?arg 1=value&argN=value and arguments may be received in the Server 26 side of the link in the manner:

arg 1=Request.QueryString("arg 1"), and will (Step 58) invoke the appropriate ASM 40 through the associated ASO 36.

The ASO 36 will (Step 60) execute the selected ASM 40. The executed ASM 40 can then return data to the TASP 46 in either of two ways. First, (Step 60a) the ASM 40 may use an HTTP to write data in HTML to the TASP 46 executing in the background in Client 22 or, second, (Step 60b) the ASM 40 can use an HTTP to send a return code that can be processed by the TASP 46 executing in the background in Client 22. The originally invoked Applet 42 can then (Step 62) read as input from the TASP 46 page the output from the ASM 40 that was written to the TASP 46 page, (Step 64) parse the data, and (Step 66) use the data to update the display of the Applet 42, thereby providing feedback to the user regarding the execution of the operation on Server 26 that was requested by the user.

Referring now to FIGS. 4A through 4E, the present invention is described in still further detail therein by illustrative examples of the various forms of program code executed by the present invention at certain of the steps described just above with reference to FIG. 3.

Referring to FIG. 4A, therein is represented an example of an Applet 42 tag residing in a TASP 46 on a Server 26 and that may be downloaded to a Client 22, wherein the example of an Applet 42 that may be run and displayed by the Browser 32 in the Client 22 is indicated therein by shading.

FIG. 4B, in turn, illustrates an example of Java code for making a connection between an Applet 42 and the executable TASP 46 page that is executed in the background on a Client 22 and to retrieve data from an ASO 36 and return data to an Applet 42. As has been described, and as will be understood by those of skill in the relevant arts, Java code as illustrated in FIG. 4B opens a connection to a TASP 46, resulting in processing of the TASP 46 page. This code creates a URL (Uniform Resource Locator) object that represents a URL, which is a pointer to a "resource" on the WWW, in this instance the TASP 46, and parameters may be passed to the TASP 46 if desired. As described previously, the URL object is created from a string having the form:

http://hostname/page/asp?arg 1=value&argN=value

A URLConnection object, in turn, is created using the URL object wherein the URLConnection object represents a communications link between the Applet 42 and the URL. The URLConnection object instance can be used to both read from and to write to the resource referenced by the URL and, in this case, DataInputStream object is then created from the input stream of the URLConnection object.

Referring to FIG. 4C, therein is represented an example of a HTML Scriptings 48 resulting in a TASP 46 page that may be downloaded to a Client 22. As has been described, and while the Applet 42 discussed above is displayed by the Browser 32, this portion of the TASP 46 page is not displayed by the Browser 32 because the applet context showDocument Java method is not executed in the URL object. As has been described previously, this code creates an ASO 36 instance in Server 26 through an HTTP protocol and then invokes an ASM 40 on that object. It will be noted that a portion of the example text is again shaded, and contains delimiters "<%" and "%>", which are used to denote ASP script commands that are processed on the Server 26. The Server.CreateObject method creates an instance of a component that supports the Component Object Model (COM) on the Server 26, wherein a COM object encapsulates logic to be performed on the Server 26, and the instance of the COM object can then invoke methods that executes the logic. A COM object method is called by the Object.Method syntax, which may appear, as illustrated in FIG. 4C, as:

result=ExampleObject.GetAndReturnDataRequest.
QueryString("arg 1"),Request.QueryStr ing("argN").

FIG. 4D illustrates typical ASO 36 code that is run on the Server 26 and, in this example, the logic executed on the Server 26 processes data on the Server 26 and writes the data to the TASP 46 page residing on the Client 22. It should be noted that if data is to be returned to the TASP 46 page in the Client 22, the data is written to the TASP 46 page using an IResponse object which uses the "Write" method of the IResponse object to write a specified string to the current HTTP output which, in this case, is the TASP 46 page.

Finally, FIG. 4E contains an illustrative example of the Java code used to process input to the TASP 46 page, such as the data returned from an ASM 40 executed on the Server 26. The data returned to the TASP 46 page, identified as input data in the code example of FIG. 4E, is read by means of a DataInputStream object, which reads bytes of data from the data input stream into an array of bytes that can be processed as necessary or desired, with the data being read in a loop until there is no more data to be read.

In conclusion, it will be seen that the method of the present invention as described above allows one system, such as a Client 22, to execute operations on a second system, such as a Server 26, to perform such functions as controlling, monitoring, managing or maintaining the second system. It will also be noted that the method of the present invention requires no software in a Client 22 beyond the common Browser 32 programs normally found in any Client 22 that communicates through the World Wide Web. In addition, such Browsers 32 are commonly capable of processing and handling both Java code and HTML code so that the method of the present invention is operable with virtually any commonly and commercially available Browser 32, and is not limited to a specific Browser 32 or group of Browsers 32. In addition, it will be noted that the method of the present invention allows dynamic updating of the Java Applets 42. It will also be noted that the method of the present invention further requires only that the controlled system, that is, a Server 26 or Client 22 that is to be controlled by another Client 22, contain only commonly available and used programs, such as Microsoft's NT4.0 Internet Information Server (IIS) with Microsoft's Active Server Pages or any equivalent network server facility with equivalent scripting capabilities.

Finally, while the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. Therefore, it is the object of the appended claims to cover all such variation and modifications of the invention as come within the true spirit and scope of the invention.

What is claimed is:

1. In a system including a client system and a server system interconnected through a network wherein the server system includes a network server facility to control network communications and a server resident scripting utility for creating and executing server scripts and the client system includes a browser for communicating with the server system through the network, wherein the server system includes a resident server page that includes a scripting for creating a server object, the server object including a server method for controlling an operation of the server system, and an applet for invoking the server page and corresponding to a server method to be executed in the server system, a method for controlling an operation of the server system by the client system, comprising the steps of:

(a) downloading a translated server page from the server system to the client system wherein the translated server page corresponds to the server page resident in the server system and the script in the translated server page is translated into a form executable by the browser resident in the client system, in the client system, (b) providing an input to invoke the applet, (c) invoking the script of the translated server page by operation of the applet, and in the server system, (d) in response to operation of the translated script in the translated server page, creating an instance of the server object, and (e) executing the server method corresponding to the applet.

2. The method of claim 1 for controlling at least one operation of the server system by the client system, wherein step (d) further comprises the step of:

(d1) by operation of the translate script in the translated server page, passing an argument to server object.

3. In a system including a client system and a server system interconnected through a network wherein the server system includes a network server facility to control network communications and a server resident scripting utility for creating and executing server scripts and the client system includes a browser for communicating with the server system through the network, wherein the server system includes a resident server page that includes a scripting for creating a server object, the server object including a server method for controlling an operation of the server system, and an applet for invoking the server page and corresponding to a server method to be executed in the server system, a method for controlling an operation of the server system by the client system, comprising the steps of:

(a) downloading a translated server page from the server system to the client system wherein the translated server page corresponds to the server page resident in the server system and the script in the translated server page is translated into a form executable by the browser resident in the client system, in the client system, (b) providing an input to invoke the applet, (c) invoking the script of the translated server page by operation of the applet, and in the server system, (d) in response to operation of the translated script in the translated server page, creating an instance of the server object, and (d2) by operation of the translated script in the translated server page, passing an argument to server object, and (e) executing the server method corresponding:to the applet, and (e1) by operation of the server method, returning data to the translated server page.

4. In a system including a client system and a server system interconnected through a network wherein the server system includes a network server facility to control network communications and a server resident scripting utility for creating and executing server scripts and the client system includes a browser for communicating with the server system through the network, wherein the server system includes a resident server page that includes a scripting for creating a server object, the server object including a server method for controlling an operation of the server system, and an applet for invoking the server page and corresponding to a server method to be executed in the server system, a method for controlling an operation of the server system by the client system, comprising the steps of:

(a) downloading a translated server page from the server system to the client system wherein the translated server page corresponds to the server page resident in the server system and the script in the translated server page is translated into a form executable by the browser resident in the client system, in the client system,
  (b) providing an input to invoke the applet,
  (c) invoking the script of the translated server page by operation of the applet, and in the server system,
  (d) in response to operation of the translated script in the translated server page, creating an instance of the server object, and
    (d1) by operation of the translated script in the translated server page, passing an argument to server object, and
  (e) executing the server method corresponding to the applet, and
    (e1) by operation of the server method, returning data to the translated server page, and
    (e2) by operation of the applet, reading the data from the translated server page.

5. In a system including a client system and a server system interconnected through a network wherein the server system includes a network server facility to control network communications and a server resident scripting utility for creating and executing server scripts and the client system includes a browser for communicating with the server system through the network, wherein the server system includes a resident server page that includes a scripting for creating a server object, the server object including a server method for controlling an operation of the server system, and an applet for invoking the server page and corresponding to a server method to be executed in the server system, a method for controlling an operation of the server system by the client system, comprising the steps of:

(a) downloading a translated server page from the server system to the client system wherein the translated server page corresponds to the server page resident in the server system and the script in the translated server page is translated into a form executable by the browser resident in the client system, in the client system,
  (b) providing an input to invoke the applet,
  (c) invoking the script of the translated server page by operation of the applet, and in the server system,
  (d) in response to operation of the translated script in the translated server page, creating an instance of the server object, and
    (d1) by operation of the translated script in the translated server page, passing an argument to server object, and
  (e) executing the server method corresponding to the applet, and
    (e1) by operation of the server method, returning data to the translated server page,
    (e2) by operation of the applet, reading the data from the translated server page, and
    (e3) updating the state of the applet according to the data read from the translated server page.

\* \* \* \* \*